United States Patent [19]
Annas, Sr. et al.

[11] Patent Number: 4,697,857
[45] Date of Patent: Oct. 6, 1987

[54] FEEDER BIN

[75] Inventors: Dulin L. Annas, Sr., Hickory; Richard M. Teague, Taylorsville, both of N.C.

[73] Assignee: Anteg, Inc., Hickory, N.C.

[21] Appl. No.: 941,100

[22] Filed: Dec. 12, 1986

[51] Int. Cl.$^4$ ............................................. A47B 57/06
[52] U.S. Cl. ..................................... 312/306; 312/21; 312/312
[58] Field of Search ................. 312/21, 306, 312, 297; 211/1, 5, 207; 108/147; 200/47, 158

[56] References Cited

U.S. PATENT DOCUMENTS

| | | | |
|---|---|---|---|
| 1,025,978 | 5/1912 | Herman | 312/297 X |
| 1,680,539 | 8/1928 | Hadi | 312/306 X |
| 2,772,022 | 11/1956 | Menning et al. | 312/97 X |
| 2,875,012 | 2/1959 | Riley | 312/306 X |
| 3,104,141 | 9/1963 | Rouling | 312/306 |
| 3,172,527 | 3/1965 | Swartz et al. | 312/97 X |
| 3,227,501 | 1/1966 | Austin et al. | 312/97 |
| 3,302,827 | 2/1967 | Maslow | 312/306 X |
| 3,415,586 | 12/1968 | Hammond | 312/306 |
| 4,161,234 | 7/1979 | Munn | 312/306 X |
| 4,247,744 | 1/1981 | Bickle | 200/47 |

FOREIGN PATENT DOCUMENTS 1554208 12/1965 Fed. Rep. of Germany ........ 312/97

Primary Examiner—Joseph Falk
Attorney, Agent, or Firm—Roy B. Moffitt

[57] ABSTRACT

A feeder bin having spaced-apart, opposing side walls delimiting a cavity. Disposed in the cavity is a first guide attached to one of the sidewalls delimiting a first guide space and a second guide attached to opposing side wall delimiting a second guide space. Also included are first and second elongated flexible members, a portion of the first elongated flexible member disposed in the first guide space and the second elongated flexible elongated member disposed in the second guide space. Disposed beneath the flexible elongated members are continuous chains having upper and lower portions, the upper portion are affixed to the first terminal portion of the first elongated flexible member and the lower portions are attached to a first terminal portion of the second elongated flexible member; and, a transverse member attached to the second terminal portions of the first and second elongated flexible members.

9 Claims, 4 Drawing Figures

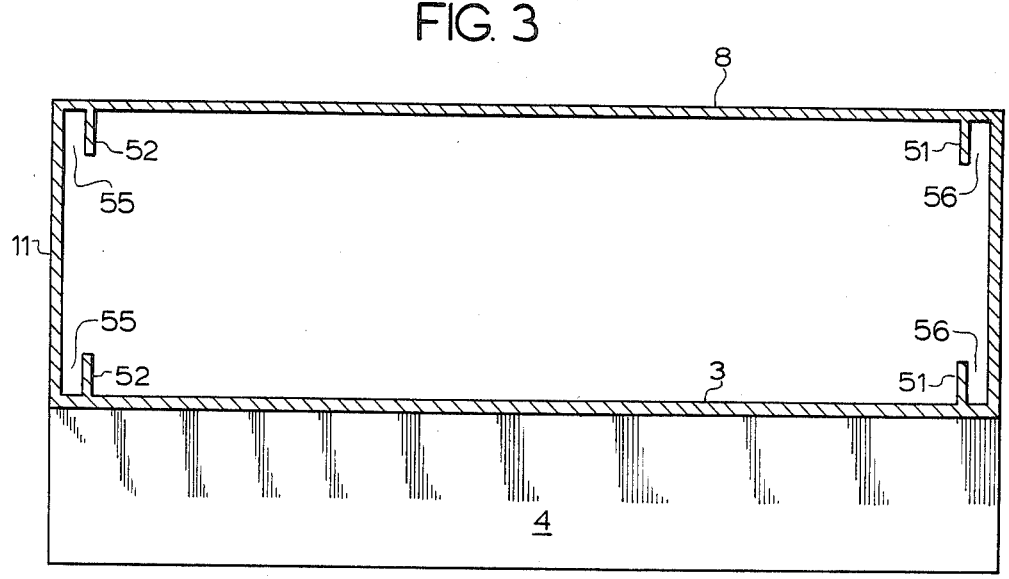
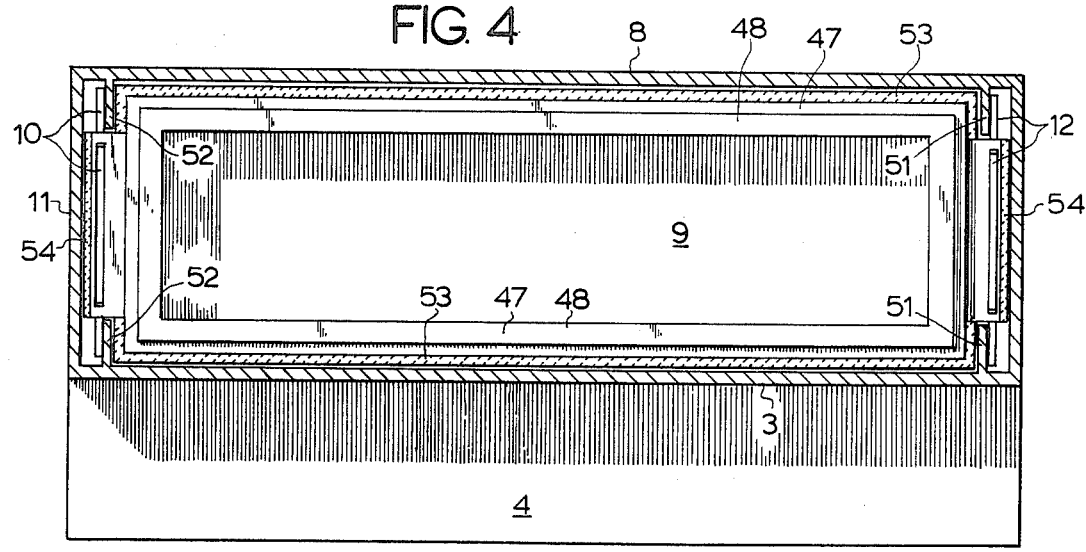

FEEDER BIN

BACKGROUND OF THE INVENTION

The invention concerns itself with a feeder bin that has a moveable bottom slideably received in a cavity delimited by a spaced-apart opposing sidewalls. Most known prior art feeder bins of the type employ a scissor-like mechanism attached to the underside of a moveable bottom to raise and lower it. This type of arrangement by its very nature takes up a significant portion of the volume delimited by the bin sidewalls, a volume that could otherwise more usefully be used to retain goods, for example socks or other flaccid articles. It is towards the solution of this volume problem that the present invention is directed.

BRIEF DESCRIPTION OF THE INVENTION

The invention is a feeder bin that has spaced-apart opposing sidewalls delimiting a cavity. In the cavity is disposed a first guide attached to one of the sidewalls delimiting a first guide space. On an opposing sidewall is a second guide that delimits a second guide space. In the first guide space is disposed a first elongated flexible member and in the second guide space a second elongated flexible member. Disposed beneath the flexible elongated members are continuous chains having an upper and lower portion, the upper portions are affixed to a terminal portion of the first elongated flexible member and the lower portions are attached to a terminal portion of the second elongated flexible member. A transverse member is attached to an opposite terminal portion of the first and second elongated flexible members. The transverse member is a frame and in the frame is disposed an open top container. By rotating the belt in a given direction, both flexible members are driven up their respective sidewalls carrying along with them the transverse member and the open top container. Socks are disposed in the bin and the moveable bottom created by the frame and the open top container allows an operator to position the socks at any given level in the bin.

BRIEF DESCRIPTION OF THE DRAWINGS

FIGS. 3 and 4 are detailed plan views of the Feeder Bin sidewall guide members of the invention.

DETAILED DESCRIPTION OF THE INVENTION

Figure 1:
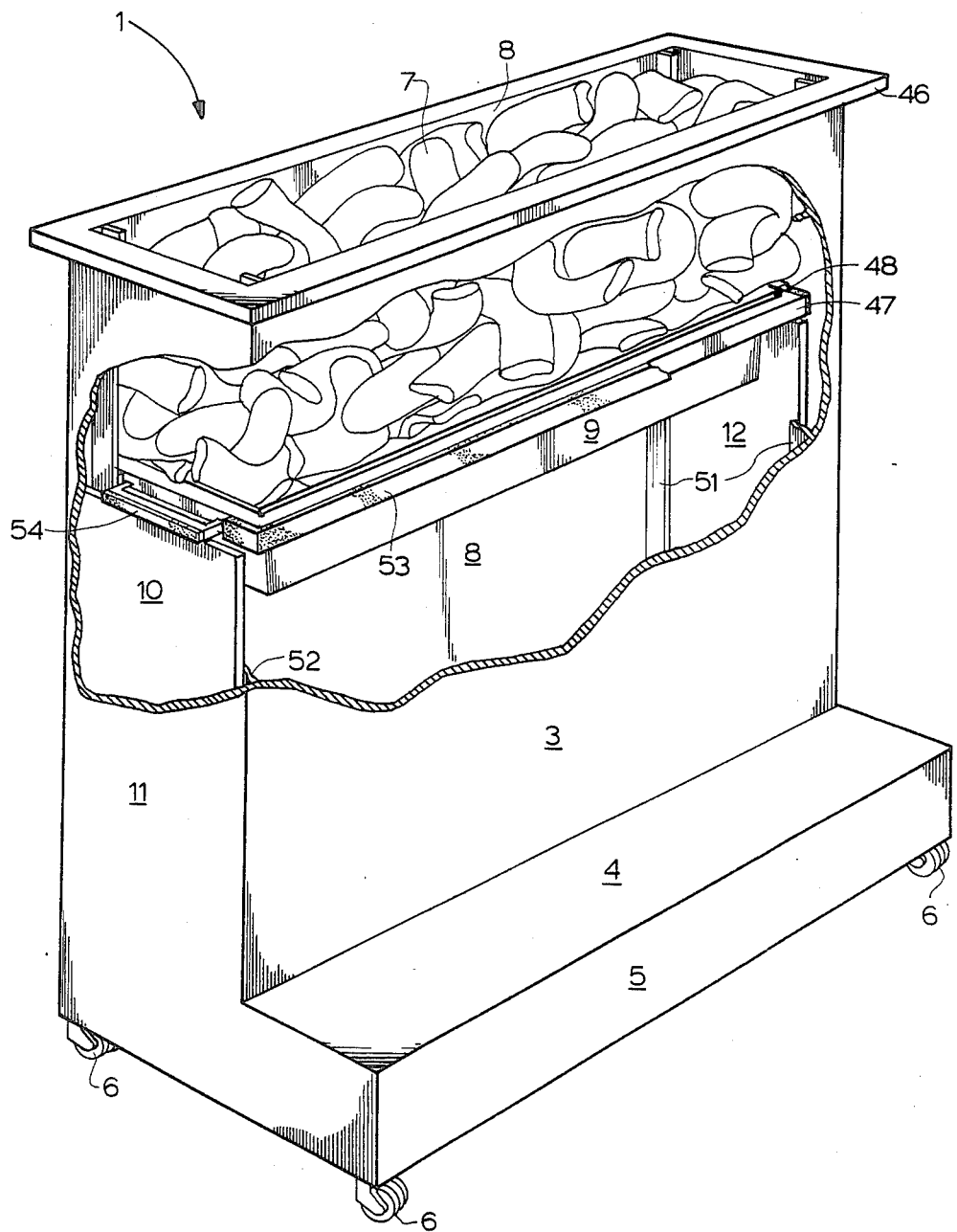
FIG. 1 is a perspective partial cut-a-way view of the Feeder Bin.

Shown by element 1 of FIG. 1 is an overall perspective view of the present invention. Element 1 is an open-top bin comprising upstanding sidewalls 3, 8, 10, and 12. An open top (not numbered) circumscribed by a flange 46. Disposed in bin 1 is open-top container 9. The open top portion of the open top container 9 is circumscribed by flange 48. Flange 47 is attached to elongated flexible members 10 and 12 so that when flexible members 10 and 12 are extended up and down sidewalls 2 and 11, open top container 9 is likewise moved up and down. An upward movement causes the uppermost level of flaccid articles 7 to move upward, if such is desired. A downward movement of elongated flexible members 10 and 12 causes open top container 9 and whatever load it carries, if any, to be lowered to almost the bottom of bin 1, i.e., just above the uppermost surface of elongated flexible member 12 as shown in FIG. 2.

Horizontal member 4, upstanding member 5, along with the lowermost portions of upstanding sidewalls 2, 11, 3 and 8 form a chamber into which the apparatus shown in FIG. 12 is disposed (apparatus chamber), apart from a foot switch identified by elements 41, 42, 43, 44, and 45. This chamber is a step-like protrusion on the lowermost portion of bin 1 and not only performs the function of an apparatus housing, but also a stabilizing base for the otherwise slender upstanding portion of bin 1.

Figure 2:
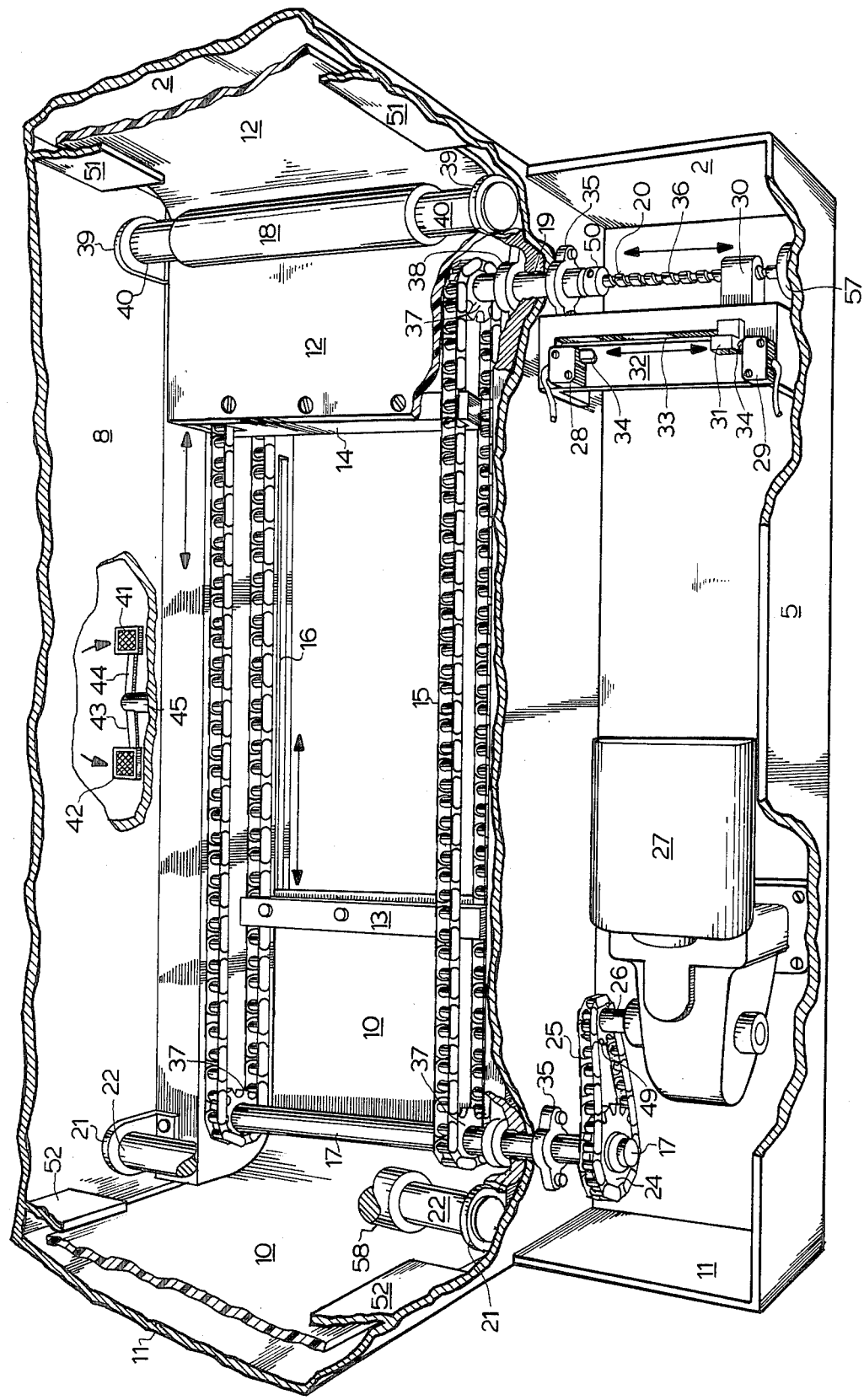
FIG. 2 is a perspective cut-a-way view of the interior mechanism of the Feeder Bin.

The operating apparatus of the invention is shown in FIG. 2 and is primarily disposed in the apparatus chamber. Directly under open top container 9 in the apparatus chamber is disposed the device that raises and lowers the transverse member or frame 47 and it includes spaced apart axles 17 and 19. Axle 17 is rotatively journaled in pillow bearings 38 and 35. On one terminal end of axle 17, socket 37 is affixed. Spaced apart from this sprocket 37 and also affixed to axle 17 is a like sprocket 37, and spaced apart from this last-mentioned sprocket 37 is sprocket 24, affixed to the other terminal end of axle 17. Threaded over sprocket 24 is chain 25. Drive sprocket 49 is affixed to drive shaft 26 of motor 27. Chain 25 is threaded over a drive sprocket 49 so as to provide power to drive axle 17 in either a clockwise or a counterclockwise direction. Axle 19 (right hand portion of FIG. 2) is rotatively disposed (as was the case with axle 17) in pillow bearings 35 and 36. Affixed to axle 19 are two (only one shown) spaced apart sprockets 37, in the same fashion as was the case with axle 17. However, axle 19 does not have affixed to it a sprocket like that of sprocket 24, but instead has a protruding device 20 which has open threads 36 therein. Continuous chains 15 and 16 are threaded over sprockets 37 of axles 17 and 19 to create a chain driven mechanism.

Each continuous chain 15 and 16 (continuous members) when so threaded, have an uppermost and a lowermost leg, one parallel to the other. To the uppermost legs of continuous chains 15 and 16, there is also affixed transverse member 14 and to transverse member 14 is affixed one terminal portion of elongated flexible member 12. To the lowermost legs of continuous chain 15 and 16, there is affixed transverse member 13 and to transverse member 13, there is affixed one terminal portion of elongated flexible member 10. Element 10 is disposed under axle 17 and between guide member 20 and sidewall 11. Elongated flexible member 12 is disposed under guide 18, which is disposed on axle 40. Axle 40 is rotatively journaled in bearings 39.

Guide member 58 is an elongated roller disposed on axle 22. Axle 22 is rotatively journaled in bearings 21. Affixed to sidewalls 2 and 11 are first and second guide members 51 and 52, each of which delimit first and second respective guide spaces 55 and 56. Disposed in the guide space 55 is elongated flexible member 10 and disposed in guide space 56 is elongated flexible member 12. Guide members 51 and 52 and their respective guide spaces 55 and 56 provide a track within which their respective elongated flexible members are constrained to travel in the vertical path. Once they leave such vertical paths and are traversed around guide rollers 58 and axle 17, they travel in a horizontal path. Because element 12 is affixed to the uppermost leg of chains 15 and 16 and element 10 by means of element 13 is affixed to the lowermost leg of the same chains, rotation of chains 15 and 16 in a clockwise direction by motor 27

(through elements 26, 19, 25, 24, 17, and 37), drives elements 10 and 12 up sidewalls 2 and 11. A counter-clockwise rotation of chains 15 and 16 reverses this action, causing elongated flexible members 10 and 12 to overlie one another in a spaced apart parallel manner like that of the upper and lower legs of continuous chains 15 and 16. Because frame 47 is affixed to elements 10 and 11 and frame 48 carries in it open top container 9, flaccid articles 7 like socks, are moved upward and downward in response to the clockwise and counter-clockwise rotation of motor 27.

Felt or cloth members 53 are attached to the outermost surface of open top container 9 and cloth or felt members 54 are attached to a terminal free end of elongated flexible members 10 and 12. These cloth or felt members act as a solid "lubricant" and keep the elongated flexible members 10 and 12 and bin 1 from "binding" against one another as these respective parts are moved relative to one another.

Reference now is made to element 20 of FIG. 2. Element 20 (an elongated protrusion) contains open threads 36 and is affixed to axle 19 by means of connector 50 and rotatively journeled in bearing 57. Device 30 is threadably disposed on threaded protrusion 20. A portion of device 30 is in slideably engagement with guide 33. A clockwise rotation of protrusion 20 traverses device 30 outwardly to a first position shown in FIG. 2. By reversing the rotation of threaded protrusion 20, device 30 is traversed to the opposite end of element 20 (not shown) until it abuts connector 50, at a second position. Device 30 is slideably affixed to arm 32 to which limit switches 28 and 29 are affixed, in a spaced-apart manner, so that when device 30 is in its first position, a part of element 30, (striker 31) depresses plunger 34 of switch 29. Likewise, when device 30 is in its second position, striker 31 depresses plunger 34 of switch 28. Both switches 28 and 29 are connected (not shown) to motor 27. Depressing plunger 34 of switch 29 deactivates motor 27 and depressing plunger 34 of limit switch 28 also deactivates motor 27. These limit switches limit the movement of elements 10 and 12 in the downward and upward direction, one for the downward and one for the upward direction.

Elements 41, 42, 43, and 45 represent a foot-operated switch adapted to drive motor 27 in a clock and a counterclockwise direction. Foot pedal 41 is connected by arm 44 to conduit 45. In like manner, foot pedal 42 is connected by arm 43 to conduit 45. When foot pedal 41 is depressed, a switch (not shown) is activated that causes motor 27 to rotate in a predetermined direction, e.g., clockwise. Releasing foot pedal 41, deactivates motor 27. Depressing foot pedal 42 activates a switch (not shown) causing motor 27 to rotate in a direction opposite than was the case when foot pedal 41 was depressed. Likewise, when foot pedal 42 is released, motor 27 is deactivated. Both foot pedals 41 and 42 activate and deactivate "on" "off" type switches connected to motor 27 (not shown).

Bin 1 can be provided with rollers 6 so that it can be easily transported from place to place. The feeder bin has a vertically-movable bottom so that articles disposed in it can be maintained at a constant and desirable height, consistent to the physical build of an operator. The moveable bottom, frame 47 and open top container 9, is moved upward and downward by elongated flexible members 10 and 12. These members can be made of thin flexible steel or plastic. An operator can raise or lower open top container 9 as he or she wishes, but never beyond a predetermined point, such a point being governed by limit switch 29 for upward movement and limit switch 28 for downward movement. Because of the parallel relationship of the upper and lower legs of continuous chains 15 and 16 and the corresponding parallel relationship of elongated flexible members 10 and 12, when chains 15 and 16 are rotated counterclockwise to their limit (plunger 34 of limit switch 28 is depressed, deactivating motor 27) a compact arrangement of parts is achieved that takes up less space than prior art scissor-like apparatus, used by the prior art to raise and lower a false bottom like open top container 9.

We claim:

1. A feeder bin having spaced-apart opposing sidewalls delimiting a cavity in which there is disposed:
    (a) a first guide attached to one side wall delimiting a first guide space and a second guide attached to an opposing sidewall delimiting a second guide space;
    (b) first and second elongated flexible members each having first and second terminal portions, a portion of said first flexible member disposed in said first guide space and a portion of said second elongated member disposed in said second guide space;
    (c) a driving means for rotating a continuous loop, a continuous loop connected to the driving means, said continuous loop having upper and lower portions, said upper portion of the continuous loop affixed to said first terminal portion of said first elongated member and said lower portion of the continuous loop affixed to said first first terminal portion of said second flexible member; and,
    (d) a transverse member attached to the second terminal portions of said first and second flexible members.

2. The feeder bin of claim 1 wherein said driving means includes first and second spaced apart rollers disposed in between the upper and lower portions of the continuous loop.

3. The feeder bin of claim 2 wherein the driving means is a motor connected to said first roller.

4. The feeder bin of claim 3 further including first and second limit switches connected to the motor, whereby upon activation of the first limit switch the motor is deactivated and upon activation of the second limit switch the motor is also deactivated.

5. The feeder bin of claim 4 further including a protrusion attached to and rotatable by the rotation of the second roller and a device on the protrusion adapted to be longitudinally traversed along the protrusion in a first direction in response to the clockwise rotation of the protrusion and longitudinally traversed along the protrusion in a second and opposite direction in response to the counter-clockwise rotation of the protrusion.

6. The feeder bin of claim 5 wherein the device on the protrusion is so disposed on the protrusion so that the device is adapted to come in contact with the first limit switch when the device has been traversed to one portion of the protrusion and to come in contact with the second limit switch when the device has been traversed to another portion of the protrusion.

7. The feeder bin of claim 1 wherein the transverse member is an open frame and disposed in the open frame is a container having an open top.

8. The feeder bin of claim 7 further including a cloth member disposed between the frame and the bin sidewalls and attached to the container.

9. The feeder bin of claim 3 further including first and second "on" and "off" switches connected to the motor, when the first switch is in the "on" position, the motor drives the rollers in a clockwise direction and when the first switch is in the "off" position, the motor is deactivated and when the second switch is in the "on" position, the motor drives the rollers in a counter-clockwise direction and when the second switch is in the "off" position, the motor is deactivated.

* * * * *